(12) United States Patent
Eckardt et al.

(10) Patent No.: US 7,592,972 B2
(45) Date of Patent: Sep. 22, 2009

(54) THIN INSTRUMENT CLUSTER

(75) Inventors: Werner Eckardt, Rochester, MI (US); Vyacheslav Birman, Sterling Heights, MI (US)

(73) Assignee: Continental Automotive Systems US, Inc., Auburn Hills, MI (US)

(*) Notice: Subject to any disclaimer, the term of this patent is extended or adjusted under 35 U.S.C. 154(b) by 635 days.

(21) Appl. No.: 10/288,756

(22) Filed: Nov. 6, 2002

(65) Prior Publication Data
US 2003/0090886 A1 May 15, 2003

Related U.S. Application Data

(60) Provisional application No. 60/341,534, filed on Dec. 17, 2001, provisional application No. 60/336,247, filed on Nov. 15, 2001.

(51) Int. Cl.
*G09G 3/00* (2006.01)
(52) U.S. Cl. .......................... 345/32; 362/610
(58) Field of Classification Search ................ 345/426, 345/32, 7–9, 38–40, 42–44, 46; 362/26, 362/482, 489, 23, 619, 330, 555, 27, 581, 362/30; 116/300, 302, 323; 40/546
See application file for complete search history.

(56) References Cited

U.S. PATENT DOCUMENTS 4,131,366 A * 12/1978 Forss ........................ 356/140
4,768,300 A * 9/1988 Rutili ........................... 40/546
4,975,807 A * 12/1990 Ohashi ........................ 362/23
5,929,952 A * 7/1999 Bartha ......................... 349/65
6,025,820 A * 2/2000 Salmon et al. ............. 345/75.1
6,139,176 A * 10/2000 Hulse et al. ................. 362/581
6,179,429 B1 * 1/2001 Sheldon et al. ............... 362/26
6,499,852 B1 * 12/2002 Kino et al. .................... 362/23

FOREIGN PATENT DOCUMENTS

| DE | 4431 876 A1 | 3/1995 |
| DE | 196 22 900 A1 | 12/1996 |
| DE | 197 45 900 A1 | 5/1999 |
| EP | 0 600 158 A1 | 6/1994 |
| EP | 0616921 A2 | 9/1994 |
| EP | 0616921 A3 | 9/1994 |
| EP | 0616921 B1 | 12/1997 |
| EP | 0616921 B2 | 12/1997 |
| FR | 1.231.330 | 7/1959 |
| FR | 2 761 029 A1 | 9/1998 |

OTHER PUBLICATIONS

International Search Report, May 02, 2003.

* cited by examiner

*Primary Examiner*—Kevin M Nguyen

(57) ABSTRACT

An instrument display for a vehicle comprises a first light guide (14) in communication with a first light source (18). (FIG. 1A). The first light guide (14) directs light to a first instrument mark (22). A second light guide receives light from a second light source (34). The second light guide (26) is spaced from the first light guide (14) and directs light to a second instrument mark (24). A support (42) connects the first light guide (14) and the second light guide (26) and limits light transmission between the first light guide (14) and the second light guide (26).

13 Claims, 5 Drawing Sheets

THIN INSTRUMENT CLUSTER

CROSS REFERENCE TO RELATED APPLICATIONS

This application claims priority to U.S. Provisional Patent Application Ser. No. 60/341,534 filed on 17, Dec. 2001 and U.S. Provisional Patent Application Ser. No. 60/336,247 filed on 15, Nov. 2001.

BACKGROUND OF THE INVENTION

This invention relates to an instrument cluster for a vehicle.

Instrument clusters for a vehicle are typically located on a vehicle dashboard and may include a speedometer, tachometer, engine condition indicator, ABS braking indicator, and other vehicle marks. This cluster of display marks may have lighting to illuminate each mark, when appropriate. For example, the ABS braking mark may be illuminated when the vehicle is undergoing ABS braking. In the past, this lighting was provided by individual lamps that illuminate each indicator of the dashboard. However, this type of lighting takes up significant space and requires a high voltage circuit to supply current to each of the lamps. The high voltage further requires insulation to protect against shock, thereby increasing the cost and size of the instrument cluster.

Recently, it has become more common to use optical light guides to bring illumination to each of the display marks of the instrument cluster. However, each mark requires its own light guide and light source so that each individual mark may be separately illuminated. A typical instrument cluster has 32 separate indicators that require such lighting. Each light guide associated with each indicator is painstakingly assembled into the cluster one at a time. Consequently, a great deal of time and effort is required to individually piece the light guides into the instrument cluster.

In addition, existing light guides for an instrument display such as a dial require the use of a dial appliqué. The dial appliqué is a film of plastic having instrument display marks, such as the hash marks of a speedometer gauge, the numbers for the gauge, vehicle telltales, and other marks. Most of the dial appliqué is opaque except for the illuminated portions. A light guide used with the dial appliqué, such as the light guide for the speedometer gauge, may illuminate large portions of the dial appliqué rather than just the marks. Accordingly, existing instrument displays waste lighting energy.

A need therefore exists for a thin instrument cluster that avoids the complexity, inefficiency, and size of existing lighting systems.

SUMMARY OF THE INVENTION

The present invention comprises a light guide that transmits light from a light source to an instrument display mark. In contrast to existing systems, however, adjacent light guides are attached to each other by a support that holds them together for quick assembly into an instrument cluster. The support may be opaque to prevent the transmission of light between individual light guides. In this way, rather than have individual light guides assembled one at a time into an instrument cluster, the inventive display employs a cluster of light guides with each individual light guide attached to an adjacent light guide by the opaque support, thereby allowing a single unit to be assembled into the instrument cluster rather than individual pieces. In addition, another feature of the invention eliminates the need for a separate display appliqué by using the instrument display marks as graphical structures to direct light from the light guide to a vehicle occupant. The resulting instrument display employing these features is thin, energy efficient, and easy to assemble.

Accordingly, the inventive display comprises a first light guide with a first light source directing light to a first instrument display mark. A second light guide with a second light source is spaced from the first light guide and directs light to a second instrument display mark. A support connects the first light guide to the second light guide and limits transmission of light between the two light guides. This support permits one light guide to be illuminated without illuminating the neighboring light guide.

A control unit, such as a printed circuit board, may activate each light source. The light sources may be mounted to the printed circuit board and may comprise light emitting diodes. Structure on the light guide may be used to redirect light from the light guide to illuminate the instrument display mark. The structure may comprise micro lenses. The instrument mark may absorb the light and form a dark shape, letter, or figure on a light background.

Another feature of the invention uses each instrument display mark as a graphical structure to direct light from the light source. A light source provides light to a light guide. The structure shaped in the form of the instrument mark then directs light from the light guide to a viewer of the instrument display. The graphical structure may comprise pyramidal shaped structures formed in a shape of the instrument mark. The instrument mark may also comprise a painted or etched mark on the light guide. This feature allows the elimination of instrument panel display appliqué and results in greater energy efficiency.

The resulting inventive display permits the instrument cluster to be almost as thin as the light guide. In addition, each individual light guide may be separately illuminated without significant effort taken to piece each light guide into the instrument cluster. Indeed, the collection of light guides for each mark may comprise a single unit that may be simply assembled into the instrument cluster. Moreover, the inventive light guide uses less energy than existing systems.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
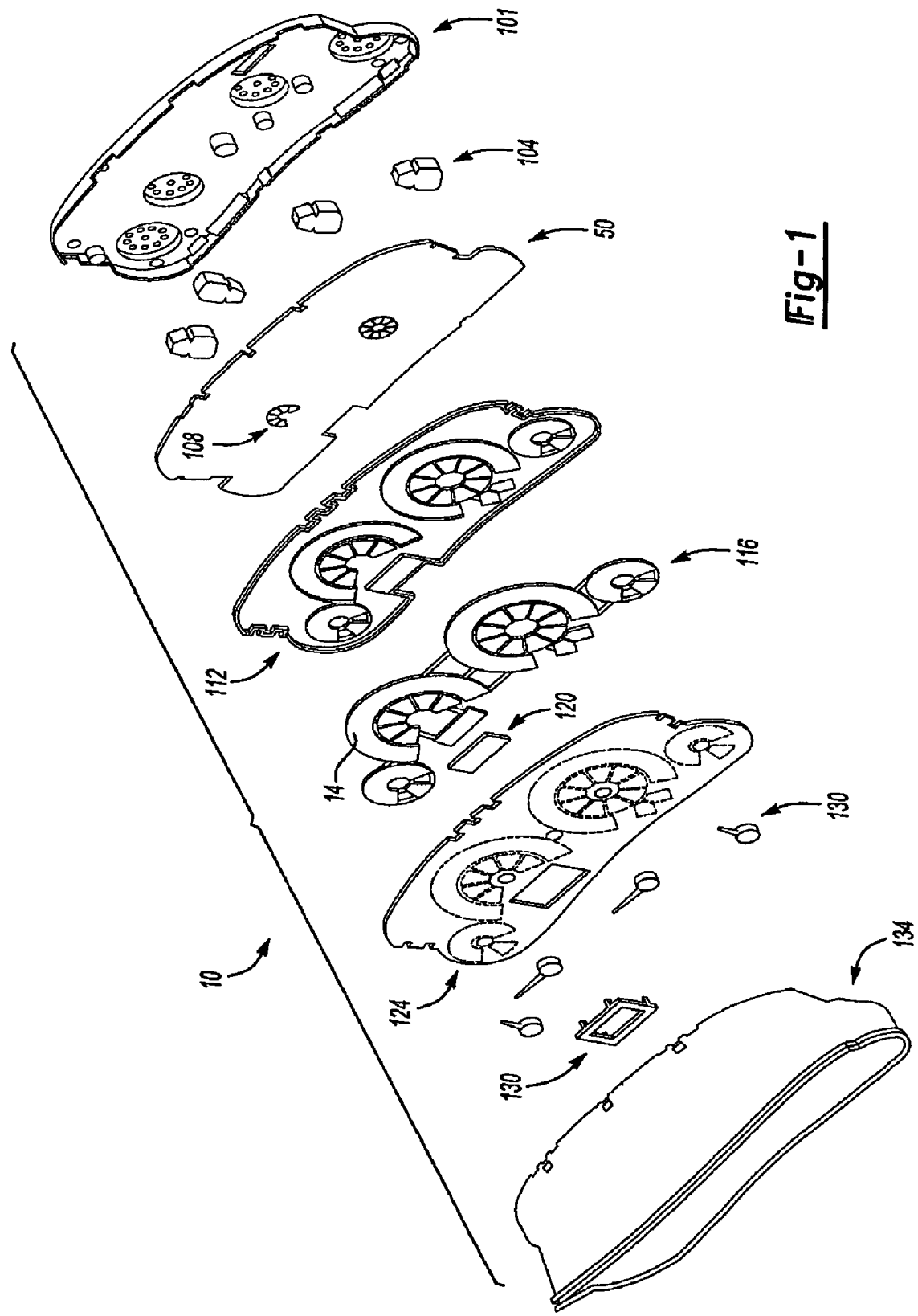
FIG. 1 illustrates the inventive instrument display.

FIG. 1 illustrates an exploded view of the inventive display 10, an instrument cluster for a motor vehicle. Back cover 101 provides support for movements 104, which are associated with pointers 130. Control unit 50, here a printed circuit board, has clusters of light emitting diodes, which are controlled by control unit 50 to respond to various vehicle conditions as known. Light emitting diodes 108 when assembled to light housing 112 protrude through light housing 112 and provide light to light guides associated with light guide cluster 116. Light from light emitting diodes 108 accordingly illuminates light guide cluster 116. Light housing 112 provides the background for light guides 116 and may be dark or light depending on the desired background effect. Liquid crystal display 120 may also be associated with instrument display 10 and be illuminated by a light guide from light guide cluster 116. Dial appliqué 124 has various marks, such as fuel level indicator, speedometer, tachometer, engine light indicator and other known vehicle display marks. A light guide from light guide cluster 116 illuminates each of these display marks. Each light guide may be individually illuminated so that each individual mark on dial appliqué 124 is separately illuminated upon the appropriate vehicle condition.

Figure 1A:
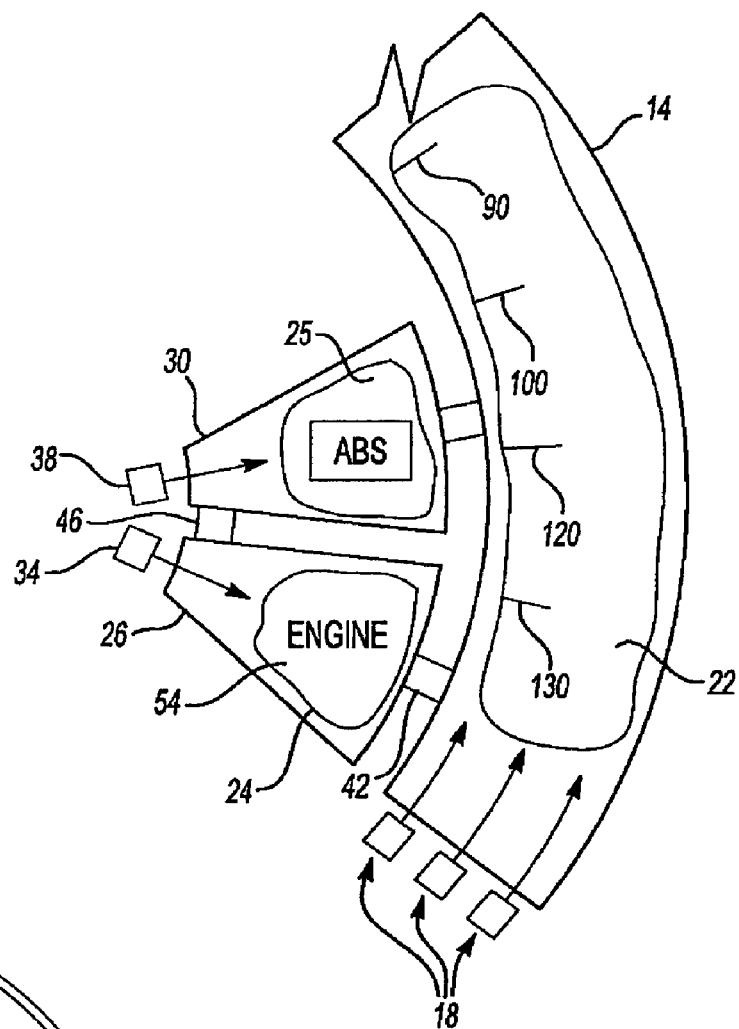
FIG. 1A illustrates light guides, supports and marks of the inventive display of FIG. 1.

As shown in FIG. 1A, first light guide 14 receives light from first light source 118, a series of light emitting diodes, along the arrows shown. This light is transmitted through light guide 14, which is made of known translucent material. First instrument mark 22, here a speedometer dial, is placed in proximity to first light guide 14 and illuminated by light traveling through light guide 14 by first light source 18. In addition, second light guide 26 has second light source 34, a single light emitting diode, shining light along the arrow shown. Second light guide 26 is in proximity to second instrument mark 24, here check engine indicator 54. Light from second light source 34 illuminates second light guide 26, which then illuminates second instrument mark 24. Moreover, as shown, third light guide 30 is located in proximity to third instrument mark 25 here, an ABS braking system indicator, and is illuminated by light from third light source 38, also a liquid emitting diode, as shown. Second light source 34 and third light source 38 are controlled by control unit 50 to illuminate when particular vehicle conditions exist. For example, in the event engine is malfunctioning, second light source 34 may illuminate second light guide 26 and second instrument mark 24, a check engine indicator. When engine conditions do not exist that require such lighting, second instrument mark 24 will not be illuminated. In this way, only relevant information about the vehicle may be relayed when needed. In addition, first instrument mark 22, here a speedometer, may be illuminated when nighttime driving conditions exist. First instrument mark 22, second instrument mark 24 and third instrument mark 25 may each be required to be separately or collectively illuminated under different conditions. Accordingly, it is desirable to illuminate these light guides only when such conditions exist to avoid confusing the driver. Therefore, each light guide should not only have its own light source as shown but should avoid transmitting light to an adjacent light guide. Light guides 14, 26 and 30 are thus spaced far enough from each other so that light within each of these guides is not transmitted to the adjacent guide.

Figure 2:
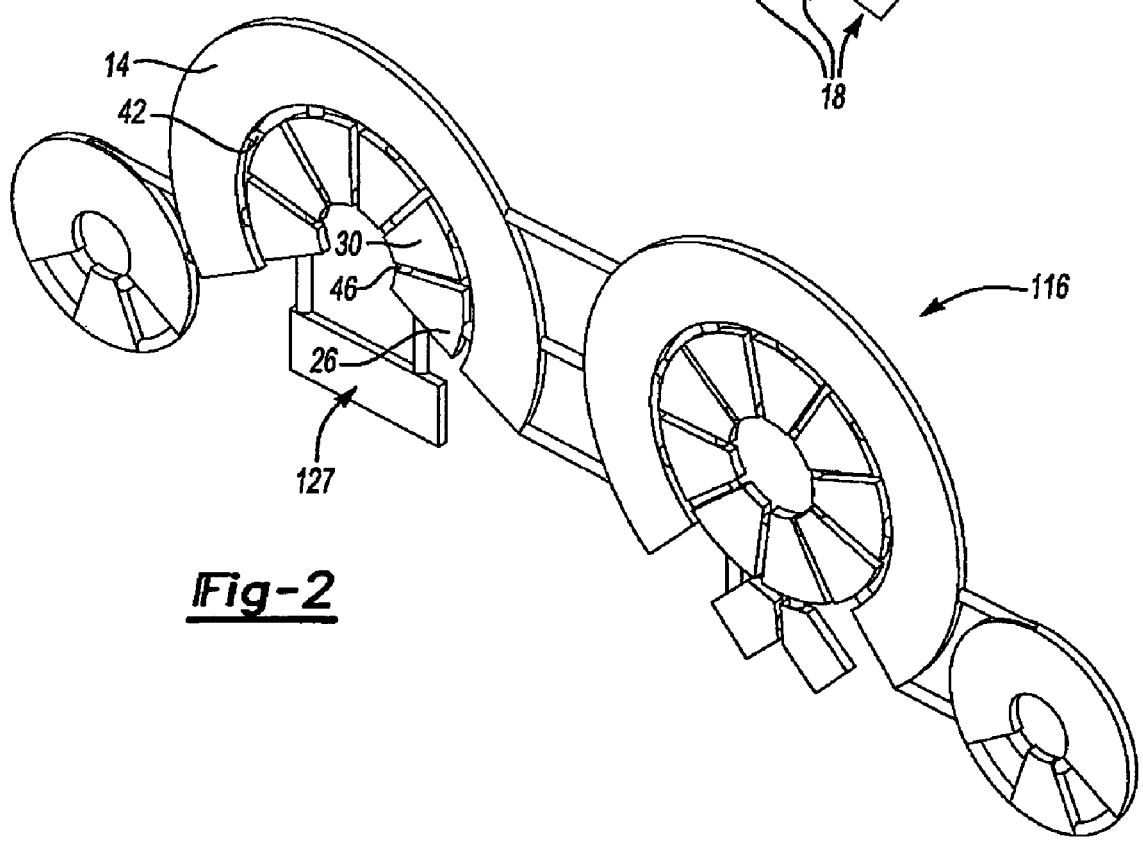
FIG. 2 illustrates a close up alternative view of light guides of FIGS. 1 and 1A.

Thus, as shown in FIG. 2, each separate mark requires its own light guide.

Given the great number of marks, a fair number of light guides are located in close proximity to each other within instrument display 10. An arrangement with many individual light guides is difficult to assemble into instrument display 10 unless supports are used to connect one light guide to the other. As shown in FIG. 1A, light guide 14 is connected to second light guide 26 by support 42 while second light guide 26 is connected to third light guide 30 by support 46. Supports 42, 46 and others like it are used to create a single unit as shown in FIG. 2. Moreover, to prevent light guide 14 from transmitting light to light guide 26, support 42 is preferably made of light absorbing material, such as ABS black plastic, so that light is not transmitted through support 42. In this way, light guides may be connected to each other without creating the potential for the transmission of light from one light guide to the next.

As shown in FIG. 2, light guide cluster 116 presents a single unit that maybe quickly assembled as part of instrument display 10. Light guide cluster 116 may be easily created from known two-shot molding techniques. Referring back to FIG. 1, light guide cluster 116 may be aligned with dial appliqué 124 so that each individual light guide is aligned with its associated mark on dial appliqué 124. Light guide cluster 116 may also provide light to liquid crystal display 120, which is held in place to instrument display by bracket 130. Mask 134 provides a protective covering for instrument display 10.

Figure 3:
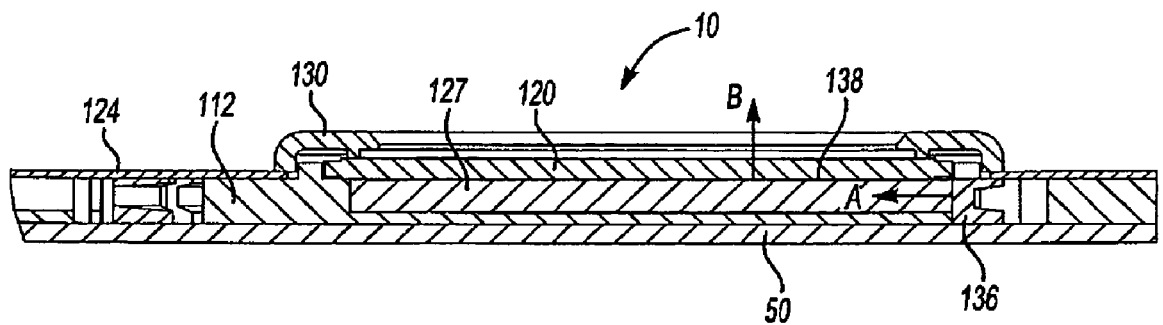
FIG. 3 illustrates a side view of the inventive display of FIG. 1.

FIG. 3 illustrates a cross-sectional portion of instrument display 10 of FIG. 1. As shown, control unit 50, a printed circuit board, supports and controls light emitting diode 136 which shines light in the direction of arrow A through light guide 127. Micro lens structure 138 on the surface of light guide 127 serves to redirect light from light guide 127 along arrow B. Micro lens structure 138 may be applied to light guide 127 through known techniques. Light traveling along arrow B is transmitted through liquid crystal display 120, which may provide additional feedback on the vehicle's condition. FIG. 3 also illustrates the reduced thickness of the inventive display. Indeed, instrument display 10 may be as thin as 6 millimeters.

Figure 4:
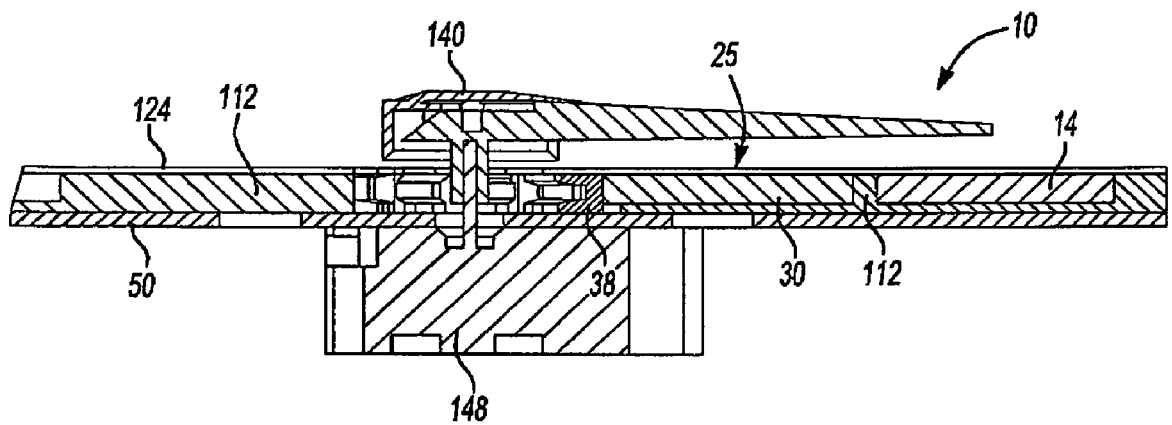
FIG. 4 illustrates a side view of the inventive display of FIG. 1.

FIG. 4 illustrates a cross-sectional view of another portion of instrument display 10. Here, pointer assembly 140 serves to provide a pointer for a vehicle mark, such as a speedometer or tachometer. Light guide 14 is supported on control unit 50. In addition, third light guide 30 is adjacent to first light guide 14 although separated by a portion of light housing 112. Dial appliqué 124 and control unit 50 serve to sandwich in place first light guide 14, third light guide 30 and other light guides of light guide cluster 116. Third light source 38, here a light emitting diode, serves to illuminate third instrument mark 25 on dial appliqué 124. Dial appliqué 124, as shown in FIG. 1A, may comprise thin plastic material with vehicle marks marked on the surface. Movement 148 serves to move pointer 140.

FIGS. 1 through 4 illustrate inventive display 10 using dial appliqué 124 to provide a surface for various vehicle marks. Micro lens structure, such as micro lens structure 138, serve to direct light through dial appliqué 124. Inventive display 10 is much easier to manufacture and assemble than existing instrument displays.

Figure 5:
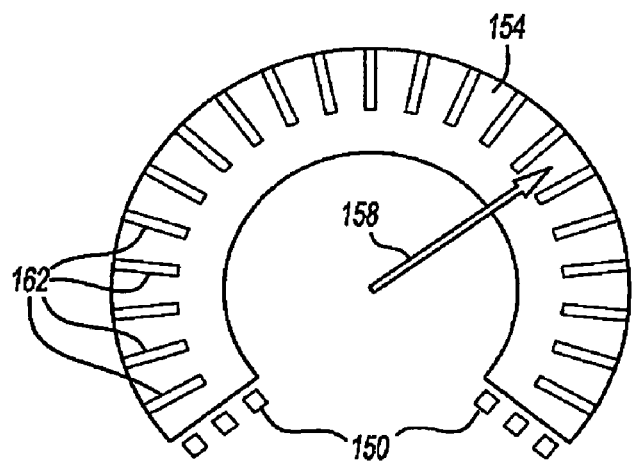
FIG. 5 illustrates a driver's view of an inventive display in which the marks are formed as part of the light guide.

Another feature of the inventive display uses instrument marks themselves to redirect light through the light guides. FIGS. 5 through 10 illustrate this particular inventive feature. As shown in FIG. 5, light sources 150, such as light emitting diodes, serve to direct light through light guide 154. As known, pointer 158 is connected to a movement to rotate along the circular path of light guide 154. Marks are placed on light guide 154 rather than on a separate dial appliqué as shown in FIGS. 1-4.

Figure 6:
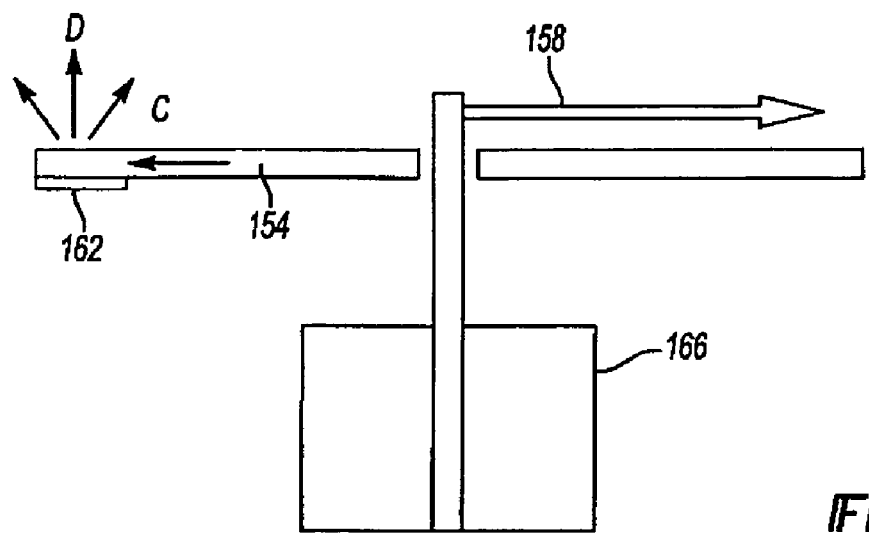
FIG. 6 illustrates a top view of the inventive display of FIG. 5.

FIG. 6 illustrates the instrument display of FIG. 5 from a top view. Movement 166, which rotates pointer 158, is also shown. As seen in this figure, graphical structure 162, here a hash mark to delineate portions of a dial such as a speedometer, are placed on the back of light guide 154 as shown. Graphical structure 162 may comprise paint on surface of light guide 154. Light transmitted through light guide 154 along arrow C is scattered and reflected by graphical structure 162 with a portion of the light traveling along arrow D, toward a viewer of the display.

Figure 8:
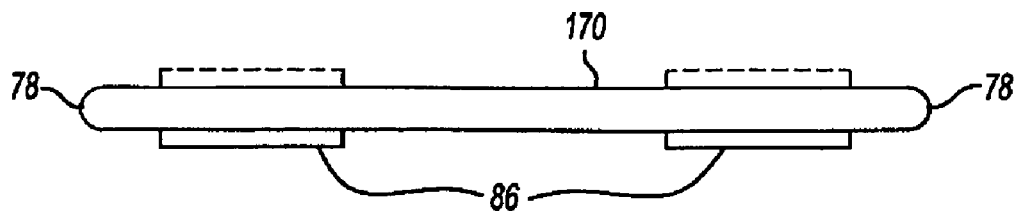
FIG. 8 illustrates a side view of an inventive display using painted marks.

FIG. 8 shows light guide 170 with graphical structure 86, painted portions, on one side of light guide 170. However, these same surfaces may be placed on the opposite side of light guide 170 as shown by the dashed lines. Preferably, light guide 170 has beveled edges 78 to help retain light within light guide 170.

Figure 7:
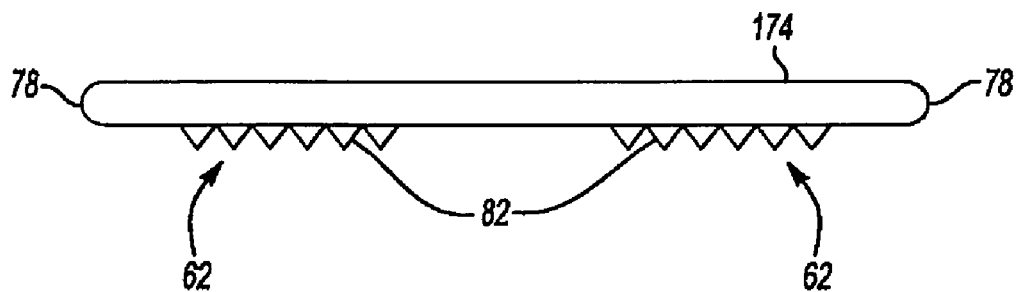
FIG. 7 illustrates a side view of an inventive display using pyramidal structures.
Figure 10:
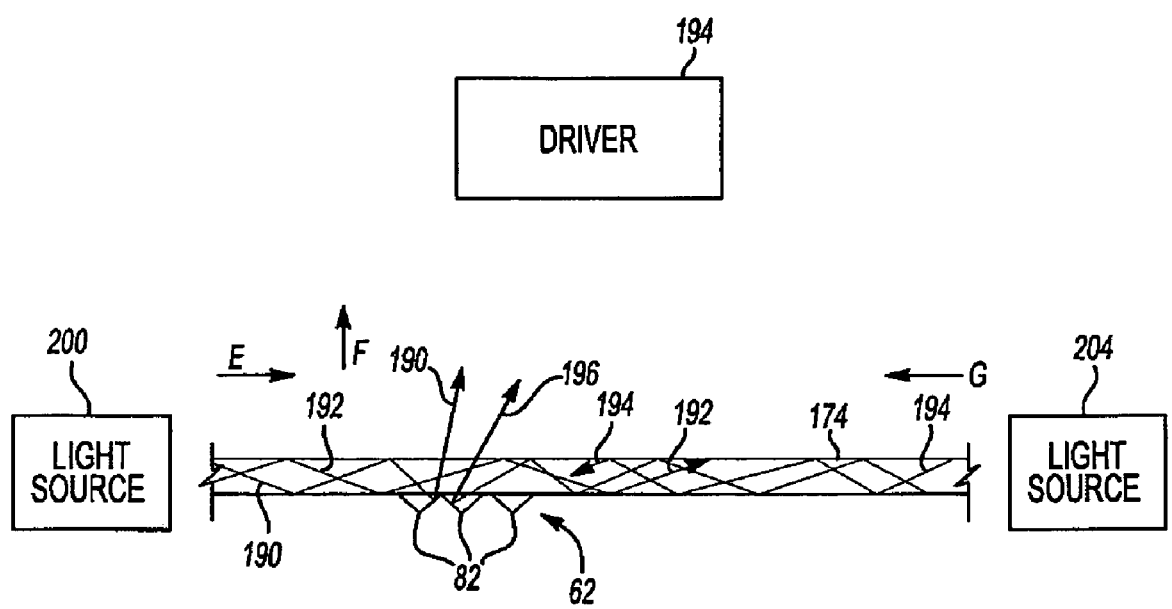
FIG. 10 illustrates the path of light of the inventive display.

FIG. 7 illustrates graphical structure 62 that serves to redirect light. Here, pyramidal shaped structures 82 are formed together in the shape of a graphical structure 62, such as a hash mark, a figure, a symbol, a check engine light or other graphic on light guide 174. As shown in FIG. 10, light in the form of light beams 190, 192 from light source 200 is transmitted through light guide 174 generally along arrow E. Light beam 190 is directed to pyramidal shape structure 82 on light guide 174, which then serves to redirect light by reflection across light guide 174 generally along arrow F toward a viewer, such as a vehicle driver 194 as schematically shown. Light beam 192 continues to travel through light guide 174 to, say, another graphical structure 62, such as another hash mark.

Because portions of light continue to pass out of light guide 174, the intensity of light decreases. To increase illumination, light source 204 is employed and communicate light through light guide 174 as well. Here, light beams 194 and 196 are transmitted through light guide 174. Light beam 196 passes out of light guide 174 to pyramidal structure 82 and is reflected across light guide 174 toward driver 194 generally along arrow F. In this way, the intensity of illumination of graphical structure may be maintained.

Figure 9:
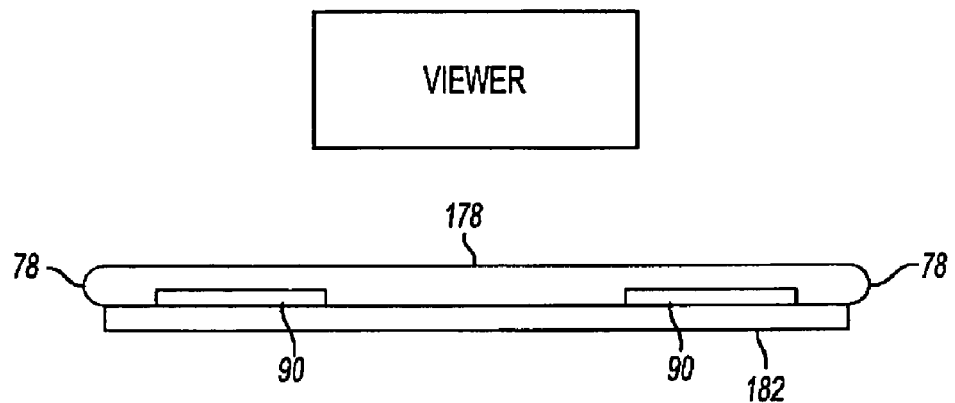
FIG. 9 illustrates an inventive display using etched marks.

FIG. 9 illustrates the use of etchings 90 as graphical structure on light guide 178. Etchings 90 serve to direct light traveling through light guide 178 toward a person viewing the display. Other graphical structures such as holograms, micro holes, or other light redirecting material or structure may be employed to accomplish the same objectives as disclosed. As further shown in FIG. 9, background mat 182 may be placed next to light guide 178, opposite the side of viewer of the display. Background mat 182 may be a film and may be dark or light to provide positive or negative background as known.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. An instrument display for a vehicle, comprising:
    a first light guide in communication with a first light source, said first light guide for directing light to a first instrument display mark;
    a second light guide in communication with a second light source, said second light guide spaced from said first light guide and for directing light to a second instrument display mark; and
    a support connecting said first light guide to said second light guide, said support being black plastic that substantially absorbs light for limiting light transmission between said first light guide and said second light guide.

2. The instrument display of claim 1 including a control unit for selectively activating each of said light sources based on vehicle conditions.

3. The instrument display of claim 1 wherein said control unit comprises a printed circuit board wherein said first light source and said second light source are mounted to said printed circuit board.

4. The instrument display of claim 1 wherein said first light source comprises a light emitting diode.

5. The instrument display of claim 1 wherein at least one of said first instrument display mark and said second instrument display mark substantially absorbs light.

6. The instrument display of claim 1 including a structure redirecting light within at least one of said first light guide and said second light guide.

7. The instrument display of claim 1 wherein said support is a solid continuous piece having one end directly connected to said first light guide and another end connected directly to said second light guide.

8. An instrument display, comprising:
    a first light guide;
    a second light guide spaced from said first light guide wherein at least one of said first light guide and said second light guide is configured to direct light to an instrument display mark; and
    a support connecting said first light guide to said second light guide, said support substantially absorbs light for limiting light transmission between said first light guide and said second light guide.

9. The instrument display of claim 8 including a structure redirecting light within at least one of said light guides.

10. The instrument display of claim 9 wherein said structure comprise a micro lens.

11. The instrument display of claim 8 wherein said support is a solid continuous piece having one end directly connected to said first light guide and another end connected directly to said second light guide.

12. The instrument display of claim 8 wherein said support significantly limits light transmission between said first light guide and said second light guide.

13. The instrument display of claim 8 wherein said first light guide, said second light guide, and said support form a single continuous piece.

* * * * *

UNITED STATES PATENT AND TRADEMARK OFFICE
CERTIFICATE OF CORRECTION

PATENT NO.       : 7,592,972 B2                                                         Page 1 of 1
APPLICATION NO. : 10/288756
DATED            : September 22, 2009
INVENTOR(S)      : Eckardt et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 995 days.

Signed and Sealed this

Twenty-first Day of September, 2010

David J. Kappos
*Director of the United States Patent and Trademark Office*